US009189269B2

(12) United States Patent
Jeon et al.

(10) Patent No.: US 9,189,269 B2
(45) Date of Patent: Nov. 17, 2015

(54) APPARATUS AND METHOD FOR PERFORMING MULTI-TASKING IN PORTABLE TERMINAL

(71) Applicant: Samsung Electronics Co. Ltd., Suwon-si, Gyeonggi-do (KR)

(72) Inventors: Han-Kyung Jeon, Seongnam-si (KR); Joo-Il Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 13/755,341

(22) Filed: Jan. 31, 2013

(65) Prior Publication Data

US 2013/0205304 A1   Aug. 8, 2013

(30) Foreign Application Priority Data

Feb. 3, 2012   (KR) .......................... 10-2012-0011107

(51) Int. Cl.
*G06F 3/048*        (2013.01)
*G06F 9/48*         (2006.01)

(52) U.S. Cl.
CPC .............. *G06F 9/4843* (2013.01); *G06F 3/048* (2013.01)

(58) Field of Classification Search
CPC .................................................... G06F 9/4843
USPC ................................................... 715/779, 795
See application file for complete search history.

(56) References Cited

U.S. PATENT DOCUMENTS

| | | | |
|---|---|---|---|
| 7,188,315 B2 * | 3/2007 | Chen et al. ..................... | 715/764 |
| 7,263,667 B1 * | 8/2007 | Hoellerer et al. ............. | 715/782 |
| 7,539,945 B2 * | 5/2009 | Conrad et al. ................ | 715/750 |
| 8,176,466 B2 * | 5/2012 | Tristram ........................ | 717/105 |
| 8,196,055 B2 * | 6/2012 | Zotov et al. ................... | 715/764 |
| 8,453,057 B2 * | 5/2013 | Stallings et al. ............. | 715/726 |
| 8,745,535 B2 * | 6/2014 | Chaudhri et al. ............. | 715/850 |
| 8,776,078 B2 * | 7/2014 | Amir et al. ..................... | 718/107 |
| 2013/0091462 A1 * | 4/2013 | Gray et al. ..................... | 715/810 |
| 2013/0097556 A1 * | 4/2013 | Louch ............................ | 715/790 |
| 2014/0075374 A1 * | 3/2014 | Jitkoff et al. .................. | 715/784 |
| 2014/0164989 A1 * | 6/2014 | Kuhne ........................... | 715/790 |

* cited by examiner

*Primary Examiner* — Omar Abdul-Ali
(74) *Attorney, Agent, or Firm* — Jefferson IP Law, LLP

(57) ABSTRACT

A multi-tasking execution apparatus and a method for easily controlling applications running in a portable terminal are provided. The apparatus includes a display and a controller. The display displays an application-containing image in which at least one specific image representing at least one application running in a background is contained and arranged. The controller operatively displays at least one specific image representing at least one application running in the background, so as to be contained in the application-containing image, and controls the at least one application running in the background by controlling the specific image based on a specific gesture.

24 Claims, 6 Drawing Sheets

APPARATUS AND METHOD FOR PERFORMING MULTI-TASKING IN PORTABLE TERMINAL

PRIORITY

This application claims the benefit under 35 U.S.C. §119 (a) of a Korean Patent Application filed in the Korean Intellectual Property Office on Feb. 3, 2012 and assigned Ser. No. 10-2012-0011107, the entire disclosure of which is hereby incorporated by reference.

BACKGROUND OF THE INVENTION

1. Field of the Invention

The present invention relates to an apparatus and method for performing multi-tasking in a portable terminal More particularly, the present invention relates to a multi-tasking execution apparatus and method capable of easily controlling applications that are running in a portable terminal.

2. Description of the Related Art

Many portable terminals still have a software platform supporting the single-tasking environment. However, these portable terminals supporting the single-tasking environment may lose competitiveness in the coming high-end smartphone market.

Recently, portable terminals capable of multi-tasking have led the new trend of the smartphone market. Such advanced portable terminals with a multi-tasking platform are expected to replace the existing portable terminals with a single-tasking platform, thereby making it possible for many users to perform multi-tasking on their own portable terminal.

To maximize the user convenience in the multi-tasking environment, there is a need for an appropriate interface that can inform users of the multi-tasking and facilitate switching between running applications.

When an application presently running on a screen is paused, the application simply disappears from the screen, so it is difficult for the user to determine whether the application has entered a background state or whether the application has been terminated.

To check a list of applications running in the background, a user must go through an annoying key input and its associated operation, though such a process for determining what applications are running in the background may be different depending on an Operating System (OS) or a platform on which a specific portable terminal operates. Further, inconveniently, the user may find it difficult to identify the applications presently running in the background, as the recently used programs (or applications) will be displayed together in the list of applications running in the background.

Therefore, a need exists for an apparatus and method for providing multi-tasking execution and for easily and intuitively controlling applications that are running in a portable terminal.

The above is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a multi-tasking execution apparatus and method capable of easily and intuitively controlling applications that are running in a portable terminal.

In accordance with one aspect of the present invention, an apparatus for performing multi-tasking in a portable terminal is provided. The apparatus includes a display for displaying an application-containing image in which at least one specific image representing at least one application running in a background is contained and arranged, and a controller for operatively displaying at least one specific image representing at least one application running in the background, so as to be contained in the application-containing image, and for controlling the at least one application running in the background by controlling the specific image based on a specific gesture.

In accordance with another aspect of the present invention, a method for performing multi-tasking in a portable terminal is provided. The method includes, if there is at least one application running in a background, displaying an application-containing image in which at least one specific image representing at least one application running in the background is contained and arranged, and if a specific gesture occurs, controlling the at least one application running in the background by controlling the specific image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
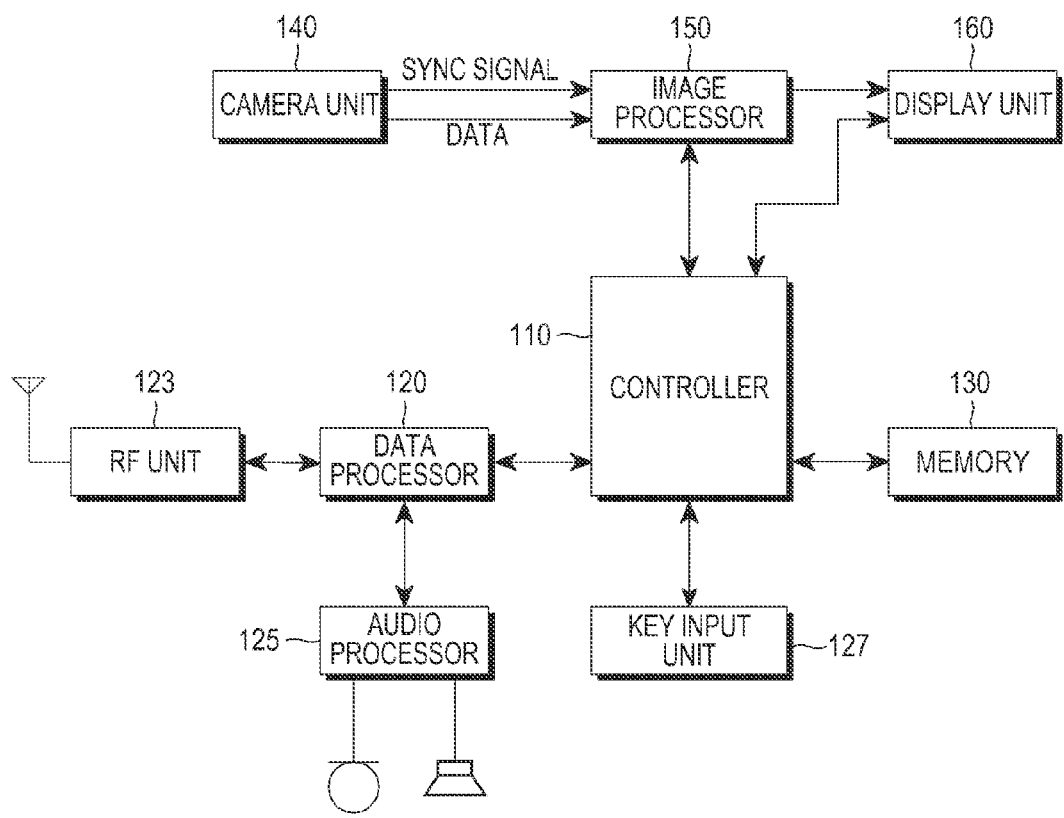
FIG. 1 shows a structure of a portable terminal according to an exemplary embodiment of the present invention.

FIG. 1 shows a structure of a portable terminal according to an exemplary embodiment of the present invention.

Referring to FIG. 1, a Radio Frequency (RF) unit 123 is responsible for wireless communication of the portable terminal. The RF unit 123 includes an RF transmitter for up-converting a frequency of transmission signals and for amplifying the up-converted transmission signals, and an RF receiver for low-noise-amplifying received signals and for down-converting a frequency of the amplified received signals. A data processor 120 has a transmitter for coding and modulating the transmission signals, and a receiver for demodulating and decoding the received signals. In other words, the data processor 120 may include a MOdulator/DEModulator (MODEM) and a COder/DECoder (CODEC). As an example, the CODEC may include a data CODEC for processing data signals such as packet data and an audio CODEC for processing audio signals such as voice. An audio processor 125 plays received audio signals output from the audio CODEC in the data processor 120 using a speaker SPK, and transfers transmission audio signals picked up by a microphone MIC to the audio CODEC in the data processor 120.

A key input unit 127 has alphanumeric keys for inputting alphanumeric information and function keys for setting a variety of functions.

A memory 130 may include a program memory and a data memory. The program memory may store programs for controlling the overall operation of the portable terminal and programs for controlling applications that are running in the portable terminal according to an exemplary embodiment of the present invention. The data memory may temporarily store the data generated during execution of the programs.

A controller 110 controls the overall operation of the portable terminal.

In accordance with an exemplary embodiment of the present invention, the controller 110 operatively displays at least one specific image representing at least one application running in the background, so as to be contained and arranged in an application-containing image, and controls the at least one application running in the background by controlling the specific image based on a specific gesture (e.g., a specific user gesture).

When there is at least one application running in the background, or when a specific gesture occurs or a specific key is input, the controller 110 of the portable terminal may operatively display the application-containing image in which at least one specific image representing at least one application running in the background is contained, in a specific region of a display 160. In an exemplary embodiment of the present invention, the specific region may be the bottom of a screen of the display 160. For example, the application-containing image is displayed as a file folder image and at least one specific image representing at least one application running in the background is displayed as a file image, providing an image that files are arranged in a file folder.

According to an exemplary embodiment of the present invention, when a touch-and-drag-down in a down direction where the application-containing image is displayed occurs on the screen of the display 160 on which a specific application is running presently, the controller 110 pauses the specific application while operatively displaying an effect that a specific image representing the specific application is contained in the application-containing image. The controller 110 operatively displays the effect that a specific image representing the specific application is contained in the application-containing image, when the drag-down crosses a reference line preset on the screen of the display 160, and returns to its original state when the drag-down does not cross the reference line preset on the screen of the display 160.

If a drag-left/right occurs after a touch-and-drag-down in the down direction where the application-containing image is displayed occurs on the screen of the display 160 on which a specific application is running presently, the controller 110 quits the specific application while operatively displaying an effect that a specific image representing the specific application disappears out of the screen or is wrinkled. The controller 110 operatively displays the effect that a specific image representing the specific application disappears out of the screen or is wrinkled, when a drag-left/right occurs after the drag-down crosses a reference line preset on the screen of the display 160, and returns to its original state when a drag-left/right occurs without the drag-down crossing the reference line.

When a touch-and-drag-left/right occurs on the application-containing image or at least one specific image contained in the application-containing image, the controller 110 operatively displays information provided by the application while sequentially expanding (or up-scaling) in the drag direction the at least one specific image representing at least one application running in the background during the occurrence of the drag. As an example, the information provided by the application may include the last screen before the pause of the application, or a name of the application, based on which the user may determine the type of the application.

If a drag in a direction opposite to the direction where the application-containing image is displayed occurs on a specific image representing an application while a touch-and-drag-left/right occurs on the application-containing image, the controller 110 resumes the application corresponding to the specific image while displaying an effect that the specific image is taken out of the application-containing image. The controller 110 operatively displays the effect that the specific image is taken out of the application-containing image, when the drag in a direction opposite to the direction where the application-containing image is displayed crosses a reference line preset on the screen of the display 160, and returns to its original state when the drag in a direction opposite to the direction where the application-containing image is displayed does not cross the reference line preset on the screen of the display 160.

If a drag-left/right occurs on a specific image while a touch-and-drag-left/right occurs on the application-containing image, the controller 110 quits an application corresponding to the specific image while operatively displaying an effect that the specific image disappears out of the screen or is wrinkled.

A camera module 140 has a camera sensor for capturing image data and converting a captured optical image signal into an electrical image signal, and a signal processor for converting an analog image signal captured by the camera sensor into digital image data. As an example, the camera sensor may be assumed to be a Charge-Coupled Device (CCD) or Complementary Metal-Oxide Semiconductor (CMOS) sensor, and the signal processor may be realized with a Digital Signal Processor (DSP). According to exemplary embodiments of the present invention, the camera sensor and the signal processor can be realized integrally or separately.

An image processor 150 performs Image Signal Processing (ISP) to display image signals output from the camera module 140 on the display 160. The ISP includes gamma correction, interpolation, spatial variation, image effecting, image scaling, Auto White Balance (AWB), Auto Exposure (AE), Auto Focus (AF), and the like. The image processor 150 processes image signals output from the camera module 140 on a frame-by-frame basis, and outputs frame image data according to the characteristics and size of the display 160. The image processor 150 having a video CODEC compresses frame image data displayed on the display 160 using a set coding scheme and decompresses the compressed frame image data into its original frame image data. The video CODEC may be at least one of a Joint Photographic Experts Group (JPEG) CODEC, a Moving Picture Experts Group-4 (MPEG4) CODEC, a Wavelet CODEC, and the like. As an example, the image processor 150 may be assumed to have an On Screen Display (OSD) feature, and may output OSD data according to the size of a displayed screen under the control of the controller 110.

The display 160 displays image signals output from the image processor 150 and user data output from the controller 110, on a screen thereof. As an example, the display 160 may include a Liquid Crystal Display (LCD). In this case, the display 160 may have an LCD controller, a memory capable of storing image data, an LCD panel, and the like. When the LCD is configured to include a touch screen feature, the LCD may serve as an input unit. As an example, the same keys as those on the key input unit 127 may be displayed on the display 160. As another example, if the LCD is configured to include a touch screen, then the key input unit 127 may be incorporated into the display 160.

In accordance with an exemplary embodiment of the present invention, the display 160 displays an application-containing image in which at least one specific image representing at least one application running in the background is contained and arranged.

An operation of controlling applications running in this portable terminal will be described in detail with reference to FIGS. 2A to 3F.

Figure 2A:
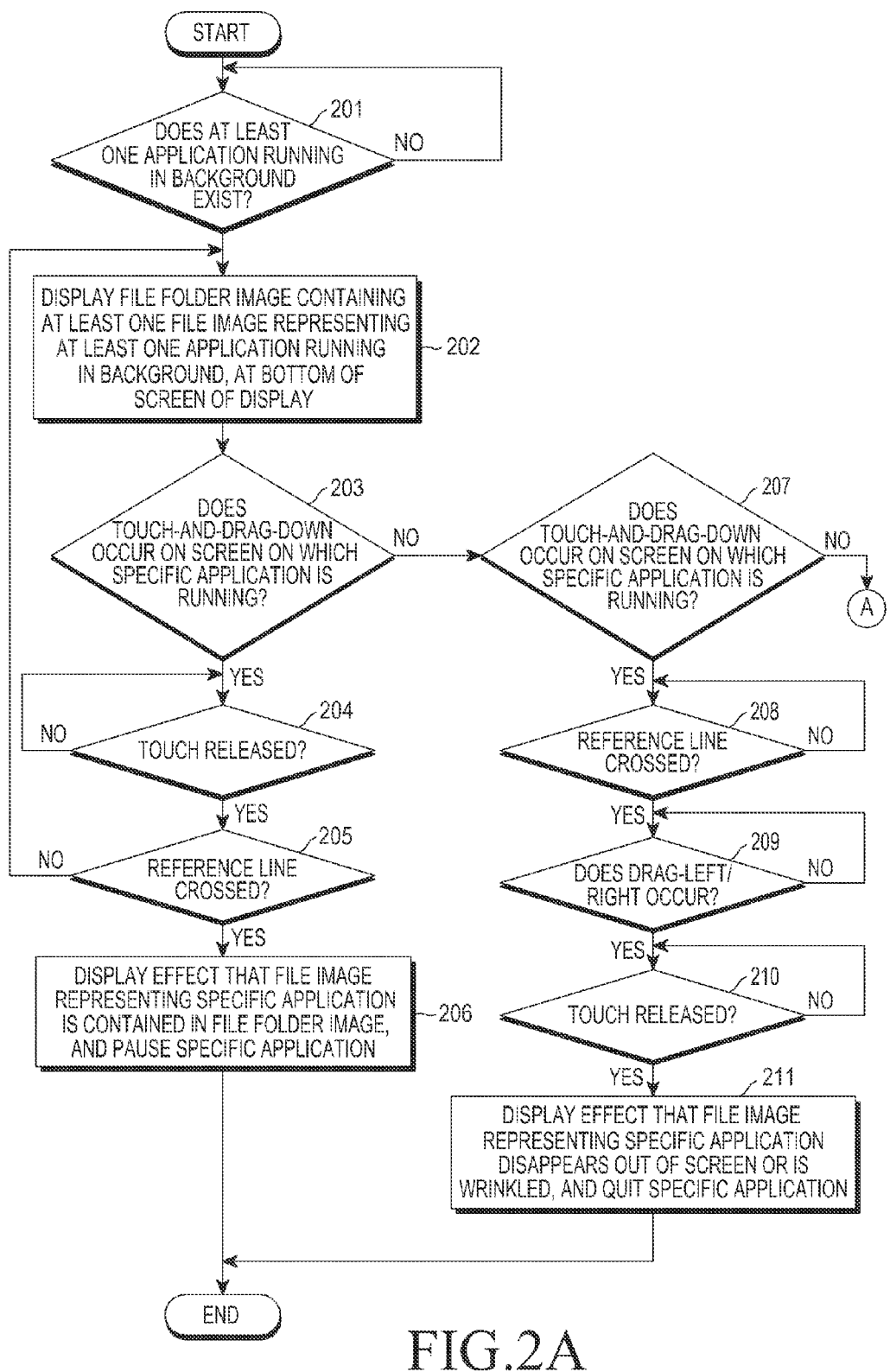
FIGS. 2A and 2B show a process of controlling applications that are running in a portable terminal according to an exemplary embodiment of the present invention.
Figure 2B:
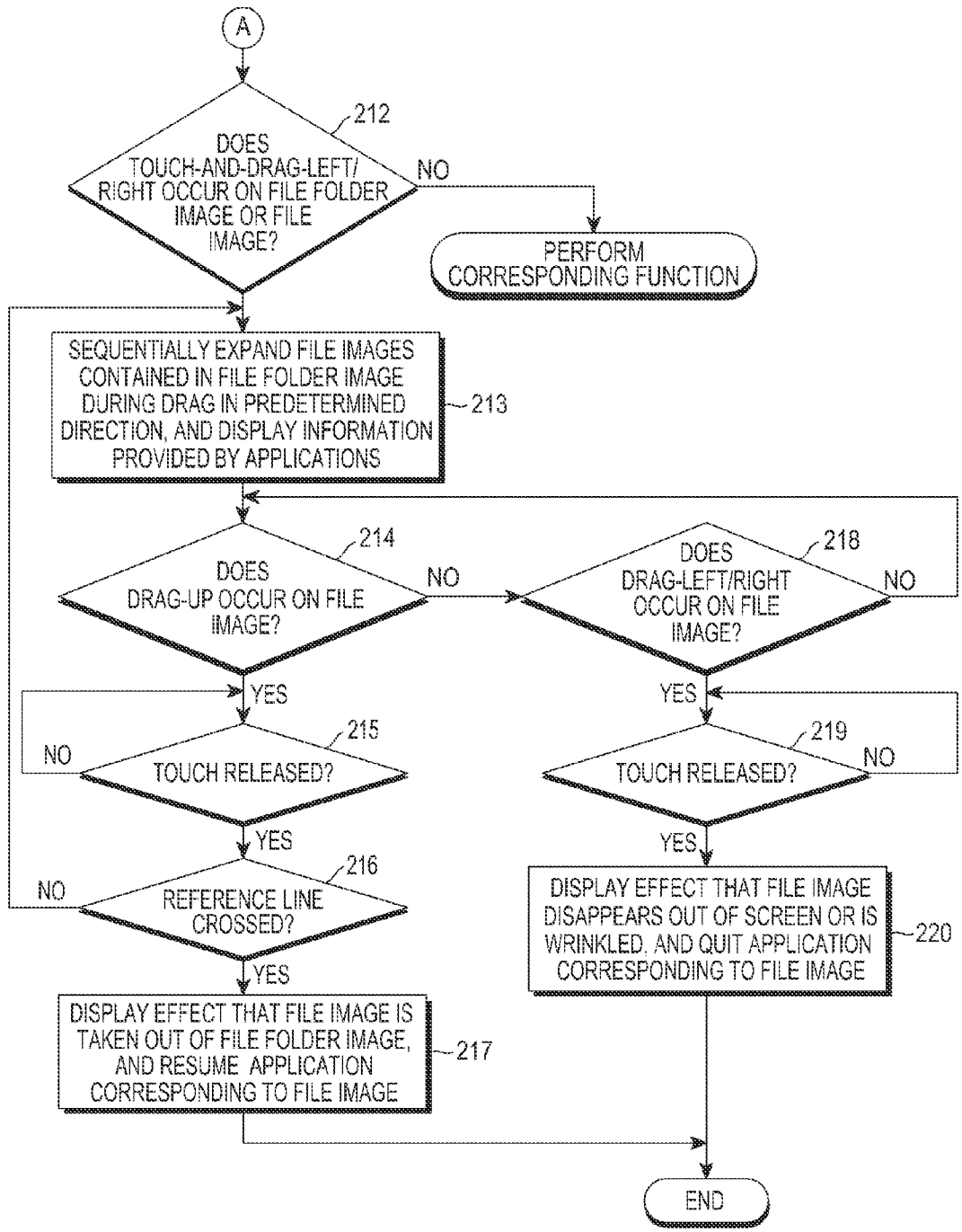

FIGS. 2A and 2B show a process of controlling applications that are running in a portable terminal according to an exemplary embodiment of the present invention, and FIGS. 3A to 3F show operations in the process of FIG. 2. According to an exemplary embodiment of the present invention, it is assumed that at least one specific image representing at least one application running in the background is a file image, and an application-containing image containing the file image is a file folder image. According to an exemplary embodiment of the present invention, it is assumed that the file folder image representing the application-containing image is displayed at the bottom of a screen of the display 160.

An exemplary embodiment of the present invention will be described in detail below with reference to FIGS. 1, 2A, 2B and 3A to 3F together.

Referring to FIGS. 2A and 2B, in step 201, the controller 110 of the portable terminal determines whether there is at least one application running in the background. If there is at least one application running in the background, then in step 202, the controller 110 displays a file folder image in which at least one file image representing at least one application running in the background is contained and arranged, at the bottom of a screen of the display 160 as shown in FIG. 3A.

Figure 3A:
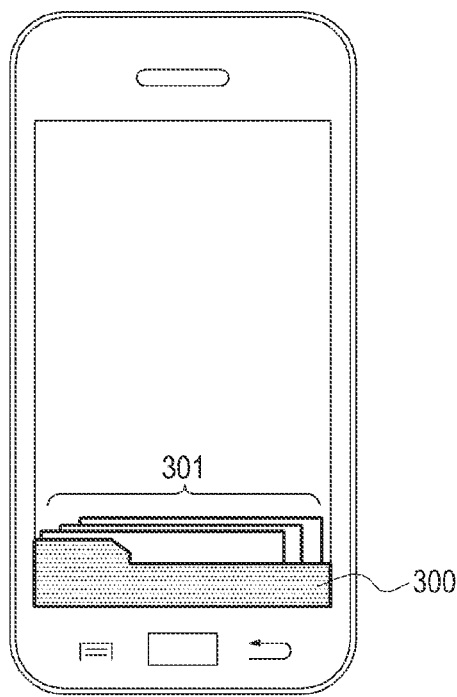
FIGS. 3A to 3F show operations in the process of FIG. 2 according to an exemplary embodiment of the present invention.

Referring to FIG. 3A, a file folder image 300, in which at least one file image 301 representing at least one application running in the background is contained and arranged, is displayed at the bottom of the screen of the display 160.

When a specific gesture occurs or a specific key is input by a user, the controller 110 may operatively display a file folder image containing at least one file image at the bottom of the screen of the display 160 in step 202.

If there is no application running in the background, or if a specific gesture occurs or a specific key is input while the file folder image is displayed at the bottom of the screen of the display 160, the controller 110 may remove the displayed file folder image.

In step 202, a specific application may be running presently on the screen of the display 160, or may be in a standby mode.

In step 203, the controller 110 determines whether a touch-and-drag-down in the bottom direction of the screen where the file folder image is displayed occurs on the screen while a specific application is running on the screen of the display 160 in step 202, the controller 110 waits for the touch to be released. If a touch-and-drag down in the bottom direction of the screen where the file folder image is displayed, then the process of controlling the applications proceeds to step 204.

In step 204, the controller determines whether the drag occurring in the bottom direction of the screen is released. If the drag occurring in the bottom direction of the screen is released in step 204, then the process of controlling the applications proceeds to step 205 in which the controller 110 determines whether the drag crosses a reference line preset on the screen of the display 160.

Figure 3B:
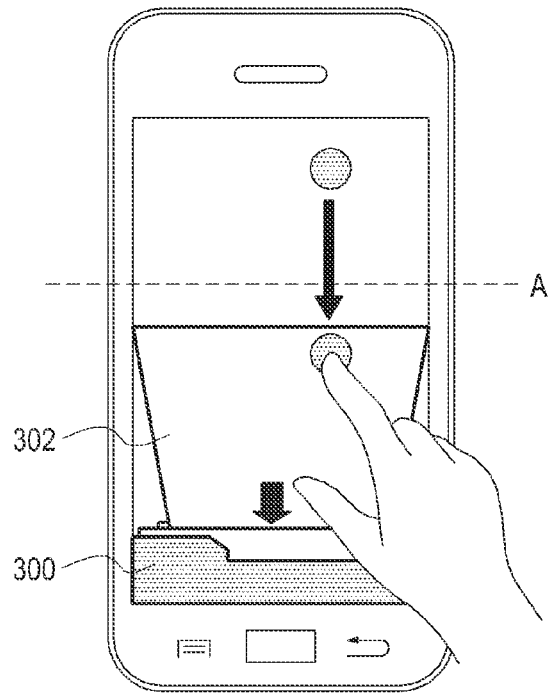

If the drag occurring in the bottom direction of the screen is released after it crosses the reference line in step 205, then the process of controlling the applications proceeds to step 206 at which the controller 110 pauses a specific application and makes it keep running in the background while displaying an effect that a file image representing the specific application running on the screen of the display 160 is contained in the file folder image as shown in FIG. 3B.

Referring to FIG. 3B, if a drag occurring in the bottom direction of the screen is released after it crosses a reference line A after a touch on a specific part of the screen, then the controller 110 pauses a specific application while displaying an effect that a file image 302 representing the specific application running on the screen of the display 160 is contained in the file folder image 300.

However, if the drag occurring in the bottom direction of the screen is released without crossing the reference line in step 205, then the controller 110 returns to step 202 at which the controller operatively displays the specific application on the screen of the display 160, returning to its original state.

If a touch-and-drag-down in the bottom direction of the screen where the file folder image is displayed occurs in step 207 on the screen of the display 160 on which the specific application is running in step 202, then in step 208 the controller 110 determines whether the drag in the bottom direction crosses the reference line preset on the screen of the display 160.

If the drag crosses the reference line in step 208, then the controller 110 waits for the next gesture. If the touch is released in step 210 after a drag-left/right occurs in step 209 after a drag-down crossing the reference line, then in step 211, the controller 110 quits the specific application while displaying an effect that a file image representing a specific application running on the screen of the display 160 disappears out of the screen or is wrinkled, as shown in FIG. 3C.

Figure 3C:
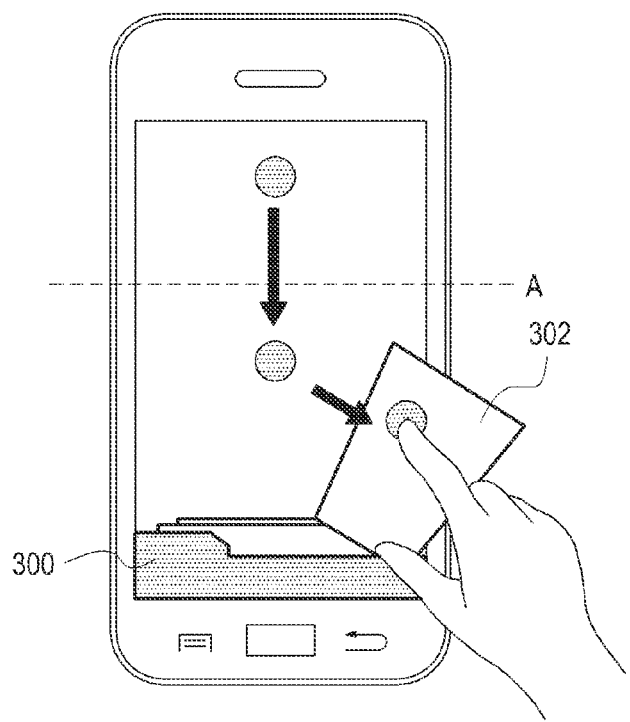

Referring to FIG. 3C, if a specific part of the screen on which a specific application is running presently is touched, and the touch is released after a drag-left/right occurs after a drag-down crossing the reference line A, then the controller 110 quits the specific application while displaying an effect that a file image 302 representing the specific application disappears out of the screen.

Figure 3D:
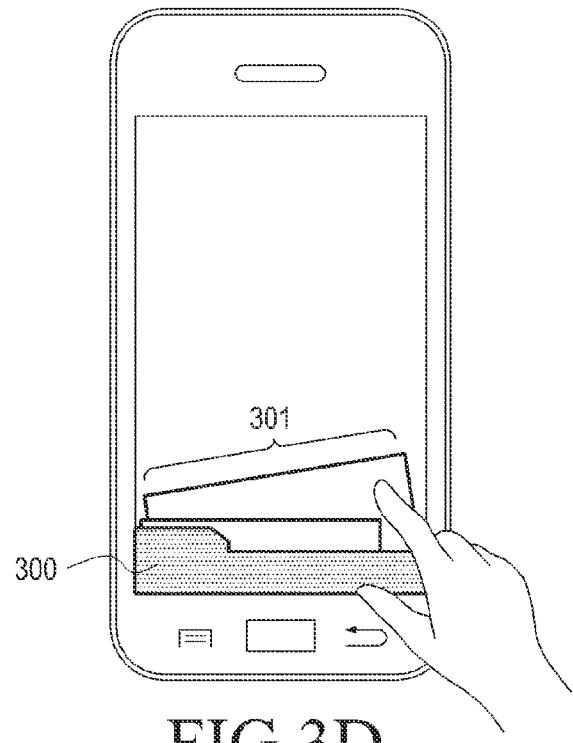

If a touch-and-drag-left/right occurs on a file folder image or a file image displayed at the bottom of the screen in step 212 while a specific application is running on the screen of the display 160 in step 202 or the screen of the display 160 is in a standby mode, then the process of controlling the applications proceeds to step 231 at which the controller 110 operatively displays information provided by the application while sequentially expanding at least one file image representing at least one application contained in the file folder image and running in the background, during the occurrence of the drag in a predetermined direction as shown in FIG. 3D.

Referring to FIG. 3D, if a drag-right occurs on the file folder image 300 or at least one file image 301 displayed at the bottom of the screen, then the controller 110 may operatively display information provided by the application (e.g., the last screen before the pause of the application and/or a name of the application), while at least one file image contained in the file folder image is taken out and expanded one by one, making it possible for the user to recognize at least one application running in the background by taking advantage of the preview feature.

The at least one file image contained in the file folder image is displayed to be contained in the order in which its associated application is paused. For example, if a drag-right occurs on the file folder image or at least one file image, file images representing paused and contained applications may be expanded and displayed in the old order, and if a drag-left occurs on the file folder image or at least one file image, file images representing paused and contained applications may be expanded and displayed in the recent order.

In step 214, it is determined whether a drag-up occurs on a file image during display of information provided by the application while sequentially expanding at least one file image contained in the file folder image during the occurrence of the drag in a predetermined direction in step 213. If it is determined, in step 214, that a drag-up occurs, the process proceeds to step 215, and then the controller 110 waits for the touch to be released.

In step 215, it is determined whether the touch is released due to the release of the drag in step 214. If it is determined, in step 215, that the touch is released, then the process of controlling the applications proceeds to step 216 at which the controller 110 determines whether the drag-up crosses a reference line preset on the screen of the display 160. If it is determined that the drag-up crosses the reference line, then the process of controlling the applications proceeds to step 217 at which the controller 110 operatively displays an application corresponding to a selected file image on the screen of the display 160 and resumes the application while displaying an effect that the file image selected by the drag-up is taken out of the file folder image, as shown in FIG. 3E.

Figure 3E:
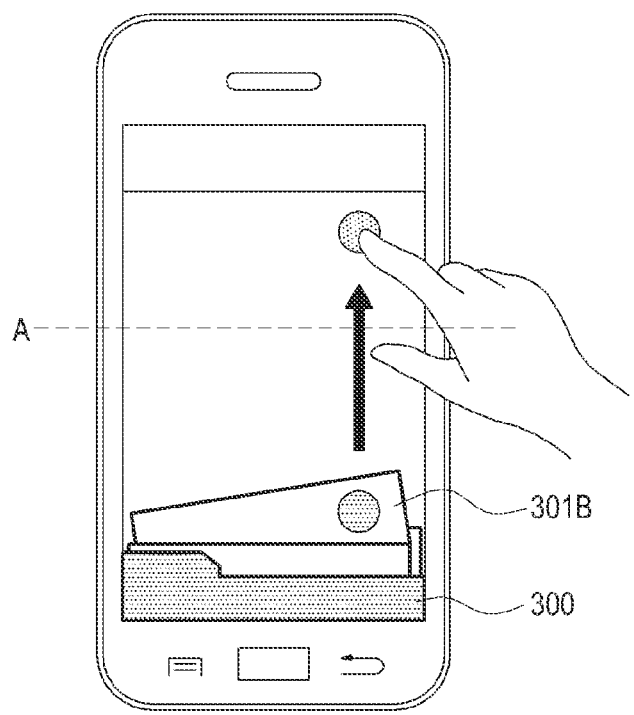

Referring to FIG. 3E, if a drag-up occurs on a file image 301B representing an application and crosses the reference line A during display of information provided by the application while sequentially expanding at least one file image contained in the file folder image 300 during the occurrence of the drag-left/right, then the controller 110 operatively displays the application corresponding to the file image 301B on the screen of the display 160 and resumes the application while displaying an effect that the file image 301B is taken out of the file folder image.

If the touch is released without the drag-up crossing the reference line in step 216, then the controller 110 returns to step 213 at which the controller 110 operatively displays information provided by the application while sequentially expanding at least one file image contained in the file folder image during the occurrence of the drag in a predetermined direction, thereby retuning to its original state.

In contrast, if it is determined that a drag-up does not occur on a file image in step 214, then the process proceeds to step 218. In step 218, it is determined whether a drag-left or a drag-right occurs. If it is determined that a drag-left or a drag-right does not occur, the process returns to step 214. If it is determined that a drag-left or a drag-right occurs, the process proceeds to step 219.

In step 219, it is determined whether a touch is released. If it is determined that the touch is released in step 219 after a drag-left/right occurs on a file image during display of information provided by an application in step 218 while sequentially expanding at least one file image contained in the file folder image during occurrence of a drag in the predetermined direction in step 213, then the process of controlling the applications proceeds to step 220 at which the controller 110 quits the application corresponding to a selected file image while displaying an effect that the file image selected by the drag-left/right disappears out of the screen or is wrinkled, as shown in FIG. 3F.

Figure 3F:
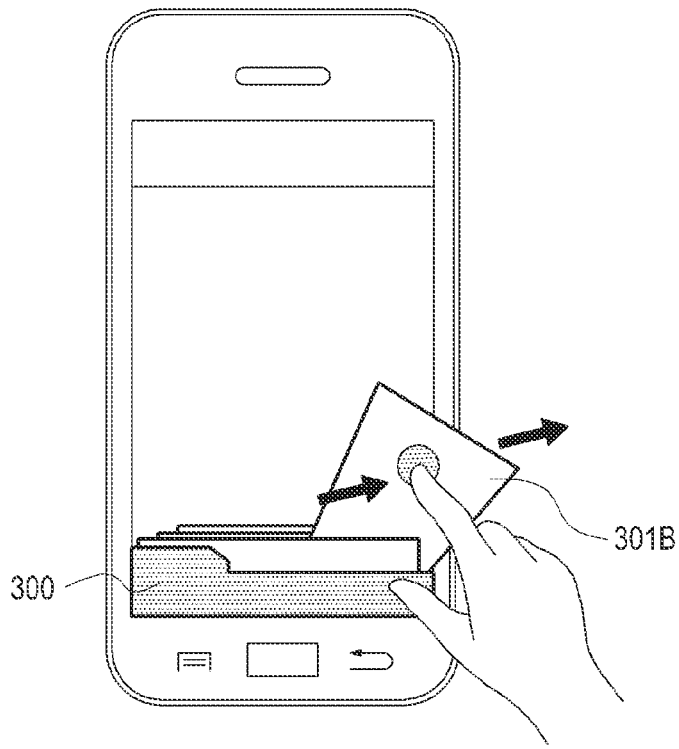

Referring to FIG. 3F, if a drag-right occurs on a file image 301B representing an application during display of information provided by the application while sequentially expanding at least one file image contained in the file folder image 300 during the occurrence of the drag-left, then the controller 110 quits the application corresponding to the file image 301B while displaying an effect that the file image 301B disappears out of the screen or is wrinkled.

As is apparent from the foregoing description, the multi-tasking execution apparatus and method provided by the present invention may easily and intuitively control applications running in the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for performing multi-tasking in a portable terminal, the apparatus comprising:
    a display for displaying an application-containing image in which at least one specific image representing at least one application running in a background is contained and arranged; and
    a controller for operatively displaying the at least one specific image representing the at least one application running in the background, so as to be contained in the application-containing image, and for controlling the at least one application running in the background by controlling the at least one specific image based on a specific gesture,
    wherein when a touch-and-drag to the left/right occurs on the application-containing image or the at least one specific image contained in the application-containing image, the controller operatively displays information provided by the application while sequentially expanding in the drag direction the at least one specific image representing the at least one application running in the background, during the occurrence of the drag.

2. The apparatus of claim 1, wherein if there is the at least one application running in the background, the controller operatively displays the application-containing image, in which the at least one specific image representing the at least one application running in the background is contained, in a specific region of a screen of the display.

3. The apparatus of claim 2, wherein the specific region is a bottom of the screen of the display.

4. The apparatus of claim 1, wherein based on a specific gesture or a specific key input, the controller operatively displays the application-containing image, in which the at least one specific image representing the at least one application running in the background is contained, in a specific region of a screen of the display.

5. The apparatus of claim 4, wherein the specific region is a bottom of the screen of the display.

6. The apparatus of claim 1, wherein the application-containing image is a file folder image, and
wherein the at least one specific image is a file image.

7. The apparatus of claim 1, wherein when a touch-and-drag-down in a down direction where the application-containing image is displayed occurs on a screen of the display on which a specific application is running presently, the controller pauses the specific application while displaying an effect that a specific image representing the specific application is contained in the application-containing image.

8. The apparatus of claim 7, wherein the controller operatively displays an effect that the specific image representing the specific application is contained in the application-containing image, when the drag-down crosses a reference line preset on the screen of the display, and returns to the original state when the drag-down does not cross the reference line preset on the screen of the display.

9. The apparatus of claim 1, wherein when a drag-left/right occurs after a touch-and-drag-down in a down direction where the application-containing image is displayed occurs on a screen of the display on which a specific application is running presently, the controller quits the specific application while operatively displaying an effect that the specific image representing the specific application disappears out of the screen, or is wrinkled.

10. The apparatus of claim 9, wherein the controller operatively displays an effect that the specific image representing the specific application disappears out of the screen or is wrinkled, when a drag-left/right occurs after the drag-down crosses a reference line preset on the screen of the display, and returns to the original state when the drag-left/right occurs without the drag-down crossing the reference line.

11. The apparatus of claim 1, wherein the information provided by the application comprises at least one of the last screen before the pause of the application, and a name of the application.

12. The apparatus of claim 1, wherein if a drag in a direction opposite to the direction where the application-containing image is displayed occurs on a specific image representing an application during the occurrence of the drag, the controller resumes the application corresponding to the specific image while operatively displaying an effect that the specific image is taken out of the application-containing image.

13. The apparatus of claim 12, wherein the controller operatively displays an effect that the specific image is taken out of the application-containing image, when the drag in a direction opposite to the direction where the application-containing image is displayed crosses a reference line preset on a screen of the display, and returns to the original state when the drag in a direction opposite to the direction where the application-containing image is displayed does not cross the reference line.

14. The apparatus of claim 1, wherein if a drag-left/right occurs on the specific image during the occurrence of the drag, the controller quits an application corresponding to the specific image while operatively displaying an effect that the specific image disappears out of a screen or is wrinkled.

15. A method for performing multi-tasking in a portable terminal, the method comprising:
if there is at least one application running in a background, displaying an application-containing image in which at least one specific image representing the at least one application running in the background is contained and arranged; and
if a specific gesture occurs, controlling the at least one application running in the background by controlling the at least one specific image,
wherein the controlling of the at least one specific image comprises:
if a touch-and-drag to the left/right occurs on the application-containing image or the at least one specific image contained in the application-containing image, displaying information provided by the application while sequentially expanding in the drag direction the at least one specific image representing the at least one application running in the background during the occurrence of the drag.

16. The method of claim 15, wherein the application-containing image is displayed in a specific region of a screen of a display.

17. The method of claim 16, wherein the specific region is a bottom of the screen of the display.

18. The method of claim 15, wherein the application-containing image is a file folder image, and
wherein the at least one specific image is a file image.

19. The method of claim 15, further comprising displaying the application-containing image upon receiving a specific gesture or a specific key input.

20. The method of claim 15, wherein the controlling of the at least one specific image comprises:
if a touch-and-drag-down in a down direction where the application-containing image is displayed occurs on a screen of a display on which a specific application is running presently, determining whether the drag-down crosses a reference line set on the screen of the display; and
if the drag-down crosses the reference line set on the screen of the display, pausing the specific application while displaying an effect that the at least one specific image representing the specific application is contained in the application-containing image.

21. The method of claim 15, wherein the controlling of the at least one specific image comprises:
if a drag-left/right occurs after a touch-and-drag-down in a down direction where the application-containing image is displayed occurs on a screen of a display on which a specific application is running presently, determining whether the drag-down crosses a reference line set on the screen of the display; and
if the drag-down crosses the reference line set on the screen of the display, quitting the specific application while displaying an effect that the at least one specific image representing the specific application disappears out of the screen or is wrinkled.

22. The method of claim 15, wherein the information provided by the application comprises at least one of the last screen before the pause of the application, and a name of the application.

23. The method of claim 15, further comprising:

if a drag in a direction opposite to the direction where the application-containing image is displayed occurs on a specific image representing an application during the occurrence of the drag, determining whether the drag crosses a reference line preset on a screen of a display; and if the drag crosses the reference line preset on the screen of the display, resuming the application corresponding to the specific image while displaying an effect that the specific image is taken out of the application-containing image.

24. The method of claim 15, further comprising:

if a drag-left/right occurs on the specific image during the occurrence of the drag, quitting the application corresponding to the specific image while displaying an effect that the specific image disappears out of the screen or is wrinkled.

\* \* \* \* \*